United States Patent
Fuwa et al.

(10) Patent No.: US 7,213,569 B2
(45) Date of Patent: May 8, 2007

(54) VALVE CHARACTERISTIC ESTIMATION DEVICE AND CONTROLLER FOR INTERNAL COMBUSTION ENGINE

(75) Inventors: Naohide Fuwa, Toyota (JP); Harufumi Muto, Ann Arbor, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/249,308

(22) Filed: Oct. 14, 2005

(65) Prior Publication Data

US 2006/0081217 A1   Apr. 20, 2006

(30) Foreign Application Priority Data

Oct. 19, 2004   (JP)   ............... 2004-304769

(51) Int. Cl.
  *F02D 13/00*   (2006.01)
  *F02D 13/08*   (2006.01)
(52) U.S. Cl. ...................... 123/345; 123/347
(58) Field of Classification Search ............. 123/90.15, 123/90.16, 350, 345, 346, 347, 348
  See application file for complete search history.

(56) References Cited

U.S. PATENT DOCUMENTS

| 6,234,144 B1 * | 5/2001 | Yamaguchi et al. | ......... 123/399 |
| 6,971,350 B2 * | 12/2005 | Akasaka et al. | ......... 123/90.16 |
| 2004/0250782 A1 * | 12/2004 | Fuwa et al. | ............. 123/90.15 |
| 2005/0000489 A1 * | 1/2005 | Fuwa et al. | .................. 123/345 |
| 2005/0010354 A1 * | 1/2005 | Fuwa et al. | .................. 701/104 |
| 2005/0229883 A1 * | 10/2005 | Arai et al. | ............... 123/90.16 |

FOREIGN PATENT DOCUMENTS

| JP | A-2000-282901 | 10/2000 |
| JP | A-2000-314329 | 11/2000 |

* cited by examiner

*Primary Examiner*—Mahmoud Gimie
(74) *Attorney, Agent, or Firm*—Oliff & Berridge, PLC

(57) ABSTRACT

A valve characteristic estimation device applied to an internal combustion engine provided with a valve characteristic adjustment mechanism for varying a valve characteristic including at least one of a valve open period and a lift amount of an intake valve. The estimation device detects intake air amount and intake air pressure of the engine, and calculates an estimated value for the valve characteristic based on the detected values of the intake air amount and the intake air pressure. Accordingly, the valve characteristic of the intake valve is accurately estimated.

5 Claims, 5 Drawing Sheets

A: knocking may occur due to delayed opening of intake valve
B: intake air amount may become insufficient due to delayed closing of intake valve
C: misfire may occur due to excess valve overlap amount

VALVE CHARACTERISTIC ESTIMATION DEVICE AND CONTROLLER FOR INTERNAL COMBUSTION ENGINE

BACKGROUND OF THE INVENTION

The present invention relates to a valve characteristic estimation device for an internal combustion engine provided with a valve characteristic adjustment mechanism for varying valve characteristics including at least one of the valve open period and lift amount of an intake valve. The present invention further relates to a controller for an internal combustion engine provided with such a valve characteristic adjustment mechanism that controls the internal combustion engine based on the detected value from a sensor for detecting the current status of the value of the valve characteristic.

A valve characteristic adjustment mechanism is a well-known mechanism incorporated in an internal combustion engine. The valve characteristic adjustment mechanism variably adjusts a valve characteristic such as the valve open period and lift amount of an intake valve according to the operation state of the engine.

In an internal combustion engine provided with such a valve characteristic adjustment mechanism, the valve open period or lift amount of the intake valve is adjusted to change the condition of the air that flows into the corresponding cylinder. Such an internal combustion engine includes a sensor for detecting the operating status of the valve characteristic adjustment mechanism. More specifically, the sensor detects the current valve open period and lift amount of the intake valve. The internal combustion engine sets a target opening degree for the throttle valve (target throttle opening degree) based on the detection results of the sensor. The amount of overlap of the intake and exhaust valves also changes when the valve open period or the lift amount of the intake valve is changed. Thus, the internal combustion engine, which includes the valve timing adjustment mechanism for variously adjusting the valve timing of the intake valve, also sets a target value for the valve timing (target valve timing) based on the detection results of the valve open period and the lift amount of the intake valve. Further, the valve characteristic adjustment mechanism, which adjusts the valve open period and the lift amount of the intake valve, is feedback-controlled so that the actual valve characteristic detected by the sensor coincides with the target valve characteristic that is set in accordance with the operation state of the engine.

If, for example, an abnormality occurs in the sensor and direct detection of the valve open period and the lift amount of the intake valve are disabled, the engine control based on the detected values of the valve open period and the lift amount of the intake valve may not be executed properly. More specifically, the target throttle opening degree or the target valve timing may not be set correctly, or the feedback control of the valve characteristic adjustment mechanism may not be executed correctly. As a result, the engine output may not follow the driver's accelerator operation and the amount of intake air may become insufficient. In some cases, this may result in a misfire and make it difficult to drive the vehicle to a safe place. To avoid such a situation, it is preferable that the internal combustion engine have a means for determining the valve open period and lift amount of the intake valve even when direct detection of the valve open period and lift amount of the intake valve with the sensor is disabled.

Conventional methods for estimating the valve characteristic, such as the valve open period and the lift amount of the intake valve, without relying on direct detection with a sensor are described, for example, in Japanese Laid-Open Patent Publication Nos. 2000-282901 and 2000-314329. The methods described in these publications use a predetermined table associated with the engine speed, the intake air amount, and the valve characteristic. By referring to the table, an estimated value of the valve characteristic of the intake valve is calculated based on the detected intake air amount and engine speed. By estimating the valve characteristic indirectly from the detected engine speed and intake air amount, engine control may be continuously executed based on the roughly determined valve characteristic of the intake valve even if direct detection of the valve characteristic with the sensor is disabled. This enables the vehicle to be driven to a safe place.

However, recent internal combustion engines for vehicles execute more sophisticated intake air control. When employing the conventional methods described above in an internal combustion engine that executes such sophisticated intake air control, the valve characteristic of the intake valve cannot be accurately estimated.

For example, in an internal combustion engine provided with the above valve characteristic adjustment mechanism, the intake air amount may be adjusted not only by adjusting the throttle opening degree but also by adjusting the valve characteristic of the intake valve. Thus, the same intake air amount may be realized by various combinations of the throttle opening degree and the valve characteristic. From such various combinations, the optimum combination of the throttle opening degree and the valve characteristic may be selected in accordance with the engine operation state to obtain a desired intake air amount. This enables the execution of a more sophisticated intake air control. Under such sophisticated intake air control, the throttle opening degree is set differently depending on the operation state of the engine even when the engine load and engine speed are constant. This changes the condition of the intake air in accordance with the set throttle opening degree. Further, if the internal combustion engine is provided with a valve timing adjustment mechanism for variably adjusting the valve timing of the intake valve in accordance with the engine operation state, the condition of the intake air changes in accordance with the operating status of the valve timing adjustment mechanism. In this way, when there are a large number of factors that change the condition of the intake air, the valve characteristic, such as the valve open period and the lift amount of the intake valve, may not necessarily be directly determined from the engine speed and the intake air amount. Thus, the above conventional methods cannot accurately estimate the valve characteristic of the intake valve.

SUMMARY OF THE INVENTION

It is an object of the present invention to provide a valve characteristic estimation device that accurately estimates a valve characteristic of an intake valve. It is a further object of the present invention to provide a controller that properly controls an internal combustion engine even when detection of a valve characteristic with a sensor is disabled.

One aspect of the present invention is a valve characteristic estimation device for an internal combustion engine that incorporates a valve characteristic adjustment mechanism for varying a valve characteristic including at least one of a valve open period and a lift amount of an intake valve.

The estimation device includes a detection unit connectable to the internal combustion engine for detecting intake air amount and intake air pressure of the internal combustion engine. An estimation unit, which receives the detected intake air amount and intake air pressure, calculates an estimated value for the valve characteristic based on the detected intake air amount and intake air pressure.

A further aspect of the present invention is a controller for an internal combustion engine that incorporates a valve characteristic adjustment mechanism, for varying a valve characteristic including at least one of a valve open period and a lift amount of an intake valve, and a sensor for detecting a current status of the value of the valve characteristic. The controller includes a control unit connectable to the engine for controlling the engine based on a detected value of the sensor. An estimation unit detects intake air amount and intake air pressure of the engine when the sensor is disabled, calculates an estimated value for the valve characteristic based on the detected intake air amount and intake air pressure, and controls the engine based on the estimated value.

Further, The present invention provides a valve characteristic estimation method for an internal combustion engine that incorporates a valve characteristic adjustment mechanism for varying a valve characteristic including at least one of a valve open period and a lift amount of an intake valve. The method includes detecting intake air amount and intake air pressure of the internal combustion engine; and calculating an estimated value for the valve characteristic based on the detected intake air amount and intake air pressure.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A valve characteristic estimation device and a controller for an internal combustion engine according to a preferred embodiment of the present invention will now be described with reference to FIGS. 1 to 9.

Figure 1:
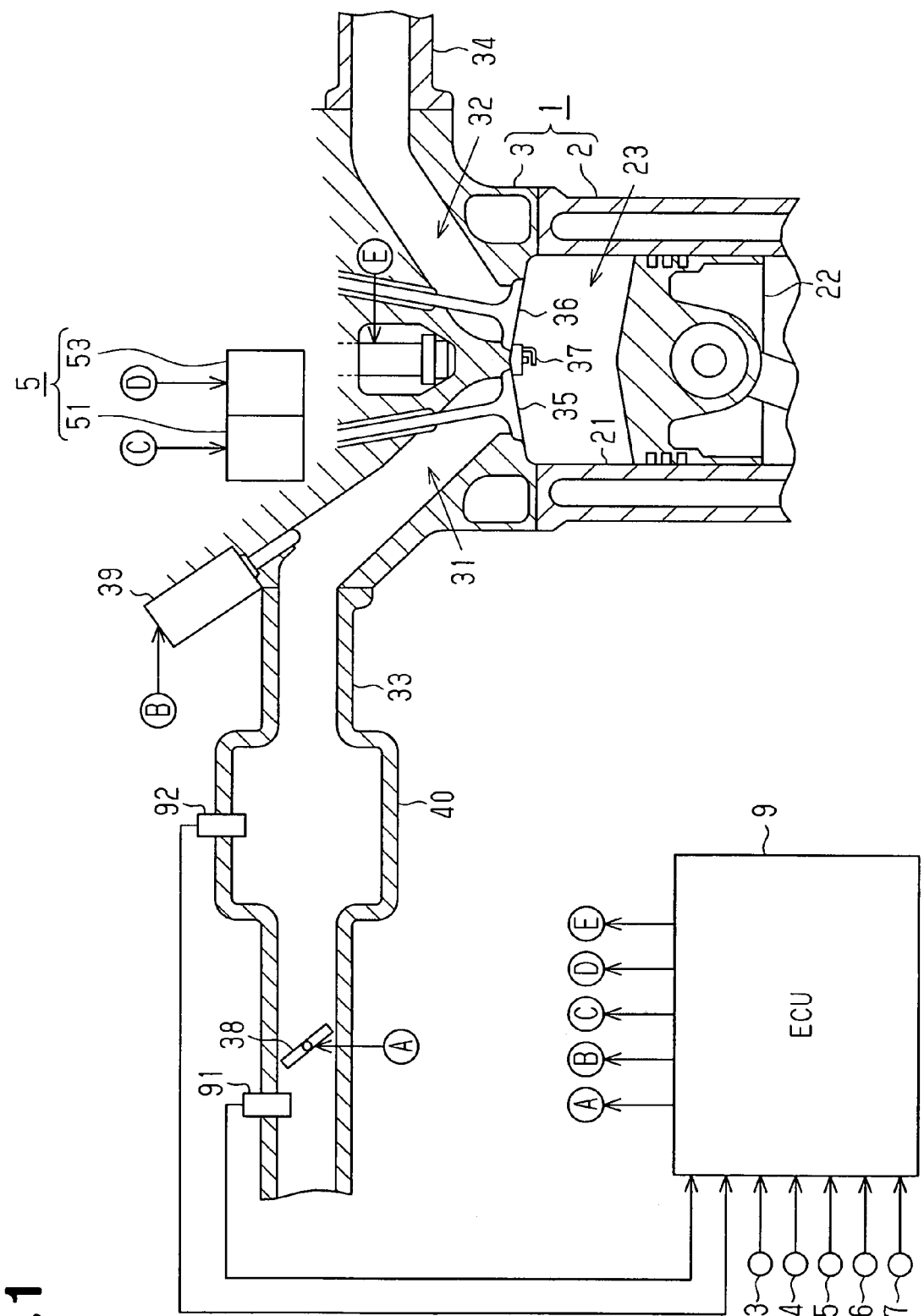
FIG. 1 is a schematic diagram showing the structure of an internal combustion engine to which a valve characteristic estimation device and a controller according to a preferred embodiment of the present invention are applied.
Figure 2:
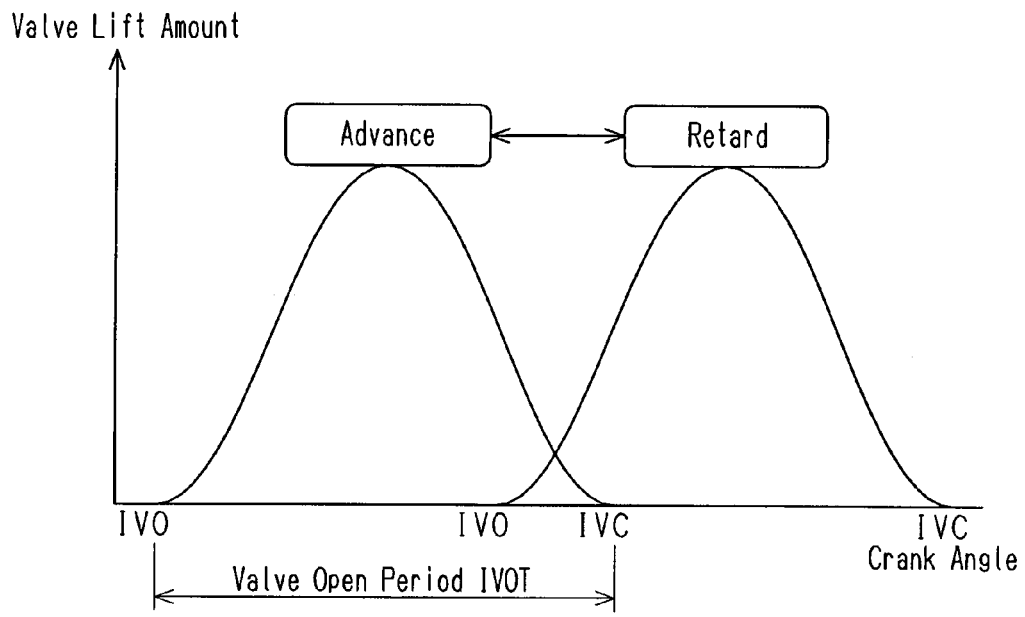
FIG. 2 is a chart showing the valve timing for an intake valve that is varied by a valve timing adjustment mechanism shown in FIG. 1.

FIG. 1 shows the structure of an engine 1 in the preferred embodiment.

As shown in FIG. 1, the engine 1 is mainly composed of a cylinder block 2 and a cylinder head 3. The cylinder block 2 includes a cylinder 21. A piston 22 reciprocates in the cylinder 21. A combustion chamber 23 is defined in the cylinder 21 between an inner surface of the cylinder 21, a top surface of the piston 22, and the cylinder head 3.

The cylinder head 3 includes an intake port 31 and an exhaust port 32. An intake pipe 33 is connected to the intake port 31. An exhaust pipe 34 is connected to the exhaust port 32. The intake port 31 is connected to and disconnected from the combustion chamber 23 by opening and closing an intake valve 35. The exhaust port 32 is connected to and disconnected from the combustion chamber 23 by opening and closing an exhaust valve 36. An injector 39 for injecting fuel into the intake port 31 is arranged in the intake port 31.

The cylinder head 3 includes an ignition plug 37 for igniting a mixture of fuel and air in the combustion chamber 23. The ignition plug 37 is arranged at the top of the combustion chamber 23.

A surge tank 40 is arranged in the intake pipe 33. A throttle valve 38, which adjusts the amount of air flowing through the intake pipe 33, is arranged upstream from the surge tank 40.

The cylinder head 3 includes a variable valve mechanism 5, which varies valve characteristics of the intake valve 35. The variable valve mechanism 5 includes a valve timing adjustment mechanism 51 and a cam angle adjustment mechanism 53. The valve timing adjustment mechanism 51 variably adjusts the valve timing of the intake valve 35. The cam angle adjustment mechanism 53 variably adjusts an operational cam angle INCAM of the intake valve 35. The operational cam angle INCAM of the intake valve 35 corresponds to the valve open period of the intake valve 35. The cam angle adjustment mechanism 53 forms a valve characteristic adjustment mechanism.

The valve timing adjustment mechanism 51 changes relative rotational phases of a camshaft for driving the intake valve 35 and a crankshaft of the engine 1. The valve timing adjustment mechanism 51 is driven to continuously vary a valve timing INVT of the intake valve 35. The valve timing INVT is varied by advancing or retarding an open timing IVO and a close timing IVC of the intake valve 35 in correspondence with the crank angle. More specifically, in a state in which the valve open period IVOT of the intake valve 35 is fixed, the open timing IVO and the close timing IVC are advanced or retarded in the manner shown in FIG. 2.

Figure 3:
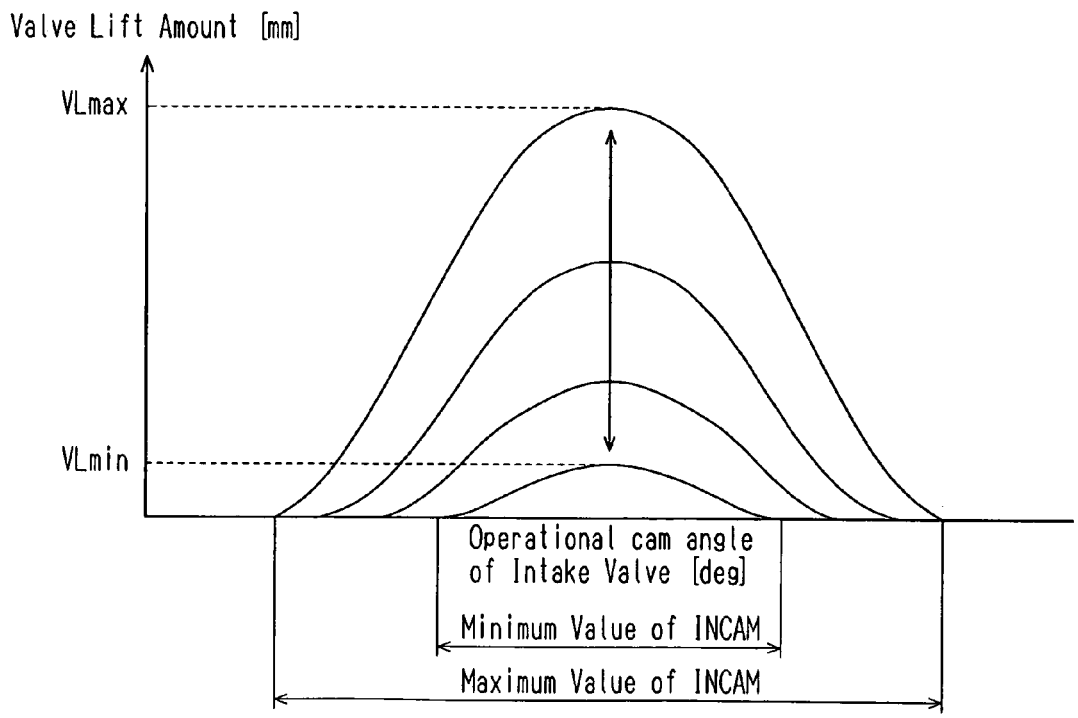
FIG. 3 is a chart showing maximum lift amounts and cam angles that are changed by a cam angle adjustment mechanism shown in FIG. 1.

The cam angle adjustment mechanism 53 continuously changes the operational cam angle INCAM of the intake valve 35, or the valve open period IVOT, and the maximum value of the lift amount (hereafter referred to as the "maximum lift amount VL"). As shown in FIG. 3, the maximum lift amount VL of the intake valve 35 is continuously varied between an upper limit lift amount VLmax, which is the largest value of the maximum lift amount VL, and a lower limit lift amount VLmin, which is the smallest value of the maximum lift amount VL. In synchronization with the continuously varying maximum lift amount VL, the operational cam angle INCAM of the intake valve 35 is changed continuously. More specifically, the operational cam angle INCAM reaches its maximum value when the maximum lift amount VL is the upper limit lift amount VLmax. The value of the operational cam angle INCAM decreases as the value of the maximum lift amount VL decreases. The operational cam angle INCAM reaches its minimum value when the maximum lift amount VL is the lower limit lift amount VLmin.

Figure 4:
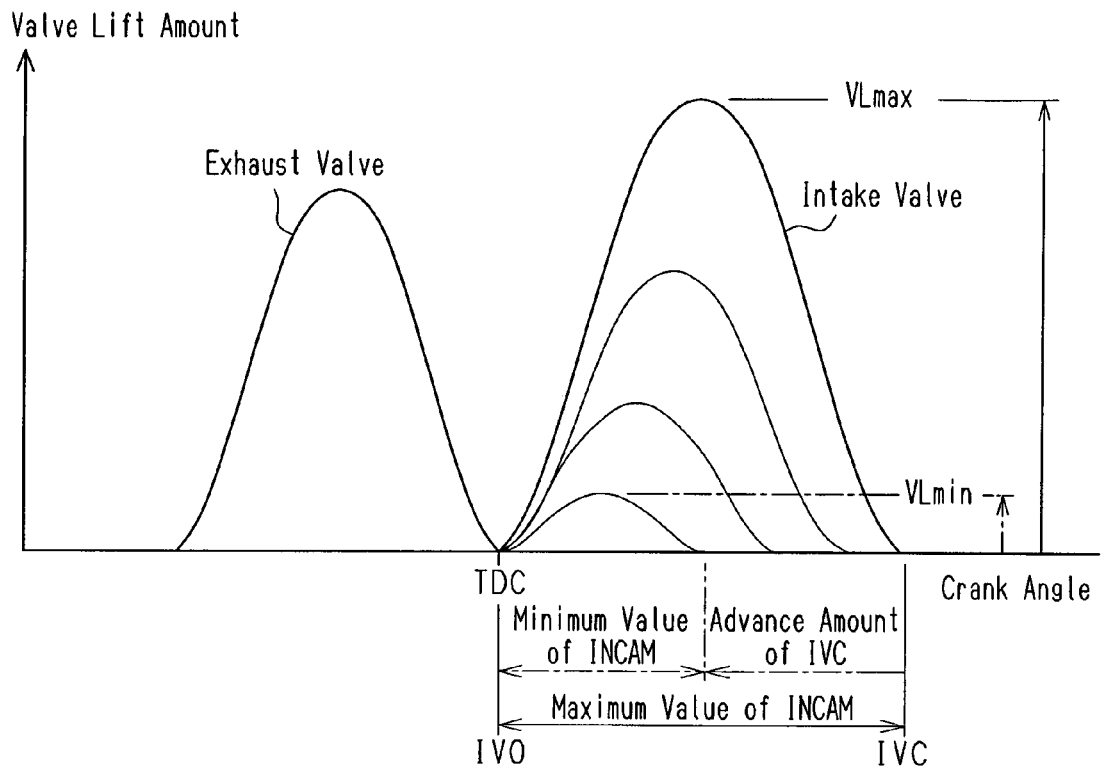
FIG. 4 is a chart exemplifying combinations of valve characteristic controls executed by the cam angle adjustment mechanism and the valve timing adjustment mechanism shown in FIG. 1.

The open timing IVO and the close timing IVC of the intake valve 35 are varied by driving the cam angle adjustment mechanism 53. However, the open timing IVO and the close timing IVC may also be set to any value by driving the valve timing adjustment mechanism 51. Thus, as shown in FIG. 4, the operational cam angle INCAM and the maximum lift amount VL may also be varied just by, for example, varying the close timing IVC without varying the open timing IVO. The operational cam angle INCAM and the maximum lift amount VL are changed by controlling the variable valve mechanism 5.

An electronic control unit (ECU) 9 executes various controls of the engine 1, such as fuel injection control, ignition timing control, intake air amount control, and valve characteristic control.

The ECU 9 includes a central processing unit (CPU) for executing calculations relating to engine control, a memory for storing programs and various information necessary for the engine control, and input ports and output ports for inputting and outputting signals to and from external devices. Various sensors, which are described below, for detecting the engine operation state are connected to the input ports.

An intake air amount sensor 91 detects the amount of air (intake air amount GA) flowing through the intake pipe 33. An intake air pressure sensor 92 detects the pressure of the surge tank 40 (intake air pressure PM). The intake air pressure PM refers to the pressure in the intake pipe at a position between the throttle valve 38 and the intake valve 35, which are arranged in the intake air passage (intake conduit or pipe 33). The intake air amount sensor 91 and the intake air pressure sensor 92 form a detection unit. A crank angle sensor 93 detects the rotation angle of the crankshaft, that is, the crank angle. The engine speed NE is calculated based on the detection signal of the crank angle sensor 93. A throttle opening degree sensor 94 detects the opening degree of the throttle valve 38 (throttle opening degree TA). A valve timing sensor 95 detects the valve timing INVT of the intake valve 35. A cam angle sensor 96 detects the operational status of the cam angle adjustment mechanism 53, that is, the current operational cam angle INCAM of the intake valve 35. An accelerator sensor 97 detects the depression amount of the accelerator pedal (accelerator depression amount ACCP). The ECU 9, which functions as a control unit, controls the engine 1 based on the detected values of the sensors 91 to 97.

Driving circuits for the ignition plug 37, the throttle valve 38, the injector 39, the valve timing adjustment mechanism 51, and the cam angle adjustment mechanism 53 are connected to the output ports of the ECU 9.

The ECU 9 adjusts the intake air amount through cooperative control of the valve timing adjustment mechanism 51, the cam angle adjustment mechanism 53, and the throttle valve 38 so that the actual intake air amount converges on the required intake air amount. The required intake air amount is calculated based on the accelerator depression amount ACCP, the engine speed NE, etc.

The throttle valve 38, the valve timing adjustment mechanism 51, and the cam angle adjustment mechanism 53 are driven to obtain the required intake air amount. To efficiently obtain the engine output, target values are set for the throttle opening degree TA, the valve timing INVT, and the operational cam angle INCAM, which are parameters relating to the intake air amount.

In the engine 1 incorporating the cam angle adjustment mechanism 53, the valve open period IVOT and the maximum lift amount VL of the intake valve 35 are varied when the operational cam angle INCAM of the intake valve 35 changes. As a result, the condition of the air flowing into the cylinder 21 also changes. Thus, the engine 1 sets the target opening degree of the throttle valve 38 (target throttle opening degree TAp) based on the detection result of the cam angle sensor 96, which detects the operational status of the cam angle adjustment mechanism 53, that is, the actual operational cam angle INCAM of the intake valve 35.

Further, the amount of overlap of the intake valve 35 and the exhaust valve 36 also changes when the operational cam angle INCAM of the intake valve 35 is changed. Thus, the engine 1 including the valve timing adjustment mechanism 51, which variably adjusts the valve timing INVT of the intake valve 35, sets the target value for the valve timing INVT of the intake valve 35 (target valve timing INVTP) based on the detection result of the operational cam angle INCAM.

Further, the cam angle adjustment mechanism 53 is feedback-controlled so that the actual operational cam angle INCAM detected by the cam angle sensor 96 coincides with the target operational cam angle INCAMP that is set in accordance with the engine operation state.

In the above engine 1, if an abnormality occurs in the cam angle sensor 96 and the operational cam angle INCAM of the intake valve 35 thus cannot be directly detected, the engine control based on the detected operational cam angle may not be properly executed. More specifically, the target throttle opening degree TAp or the target valve timing INVTp may not be properly set, and the feedback control of the cam angle adjustment mechanism 53 may not be properly executed. As a result, the engine output may not follow the driver's operation of the accelerator and the amount of intake air may become insufficient. In some cases, this may result in a misfire and make it difficult to drive the vehicle to a safe place. To avoid such situations, the ECU 9 in the present embodiment functions as an estimation unit that estimates the operational cam angle INCAM when the cam angle sensor 96 cannot directly detect the operational cam angle INCAM.

The valve characteristic estimation device of the preferred embodiment estimates the operational cam angle INCAM and executes engine control based on an estimated operational cam angle INCAMe. Such engine control, that is, the setting of the target valve timing INVTp and the correction of the target throttle opening degree Tap, will now be discussed.

Figure 5:
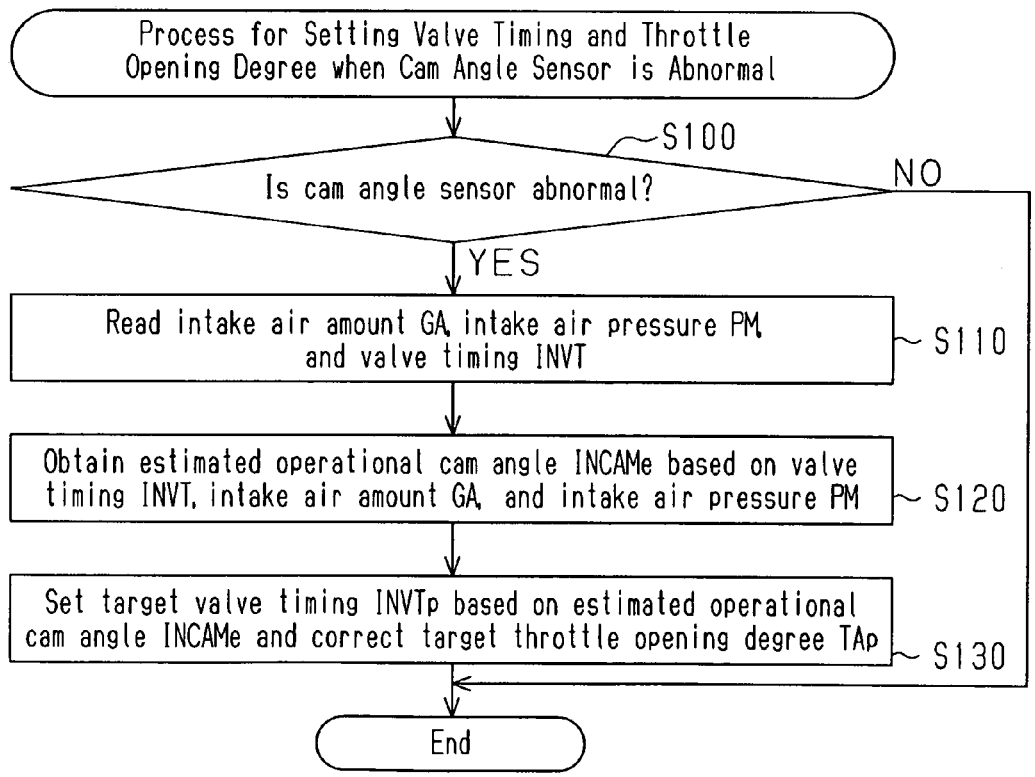
FIG. 5 is a flowchart showing the procedures for setting the valve timing and the throttle opening degree when an abnormality occurs in a cam angle sensor in the engine shown in FIG. 1.

FIG. 5 shows the procedures for setting the valve timing and the throttle opening degree when an abnormality occurs in the cam angle sensor 96. This process is repeated by the ECU 9 in predetermined intervals.

Once the process is started, the ECU 9 first determines whether an abnormality has occurred in the cam angle sensor 96 (S100). An abnormality of the cam angle sensor 96 refers to a state in which the cam angle sensor 96 cannot detect the operational cam angle INCAM. An abnormality of the cam angle sensor 96 may be an anomaly in the body of the angle sensor 96, a broken output line, or improper processing of an output signal. Abnormality determination of the cam angle sensor 96 may be carried out in any manner. For example, the cam angle sensor 96 may be determined as having an abnormality when the output of the cam angle sensor 96 is held at its maximum or minimum value. If there are two cam angle sensors 96, at least one of the two cam angle sensors 96 may be determined as having an abnormality when the difference between the output values of the two cam angle sensors 96 is greater than or equal to a predetermined value.

When the cam angle sensor 96 is determined as not having an abnormality in step S100 (S100: NO), the process is temporarily terminated.

When the cam angle sensor 96 is determined as having an abnormality in step S100 (S100: YES), the current values of the intake air amount GA, the intake air pressure PM, and the valve timing INVT are read (S110). Further, the estimated current value of the operational cam angle INCAM, or the estimated operational cam angle INCAMe, is obtained based on the read values (S120). The operational cam angle INCAM of the intake valve 35 may be estimated based on the intake air amount GA, the intake air pressure PM, and the valve timing INVT for the following reasons.

Figure 6:
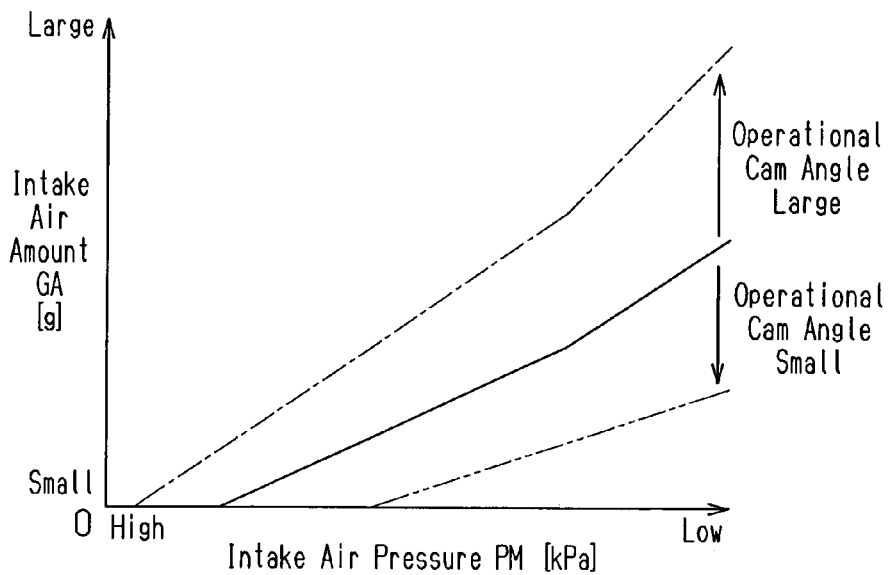
FIG. 6 is a graph exemplifying influences of the cam angle with respect to the intake air pressure and the intake air amount in the engine shown in FIG. 1.

The intake air amount GA and the intake air pressure PM are changed by changing the opening degree of the throttle valve 38. It is well known that the intake air amount GA and the intake air pressure PM are correlated with each other. The condition of intake air also changes when the operational cam angle INCAM of the intake valve 35 changes. Thus, a change in the operational cam angle INCAM of the intake valve 35 is reflected as a change in the correlation between the intake air amount GA and the intake air pressure PM. FIG. 6 shows the correspondence between the intake air pressure PM and the intake air amount GA that are changed when the operational cam angle INCAM is changed. In FIG. 6, the solid line indicates the correspondence between the intake air pressure PM and the intake air amount GA for a certain operational cam angle INCAM. The single-dot line indicates the correspondence between the intake air pressure PM and the intake air amount GA when the operational cam angle INCAM is maximum. The double-dotted line indicates the correspondence between the intake air pressure PM and the intake air amount GA when the operational cam angle INCAM is minimum.

As shown in FIG. 6, when the intake air amount GA is fixed, the corresponding intake air pressure PM decreases as the operational cam angle INCAM increases. In other words, the intake air pressure PM is more likely to be less than the atmospheric pressure (0 kPa) as the operational cam angle INCAM increases. When the intake air amount GA is fixed, the corresponding intake air pressure PM increases as the operational cam angle INCAM decreases. In other words, the intake air pressure PM approaches the atmospheric pressure (i.e., the intake air pressure PM increases) as the operational cam angle INCAM decreases. In this manner, even when the intake air amount GA is fixed, the value of the intake air pressure PM corresponding to the intake air amount GA differs depending on the operational cam angle INCAM of the intake valve 35.

Further, as shown in FIG. 6, when the intake air pressure PM is fixed, the corresponding intake air amount GA increases as the operational cam angle INCAM increases, and the corresponding intake air amount GA decreases as the operational cam angle INCAM decreases. In this manner, even when the intake air pressure PM is fixed, the value of the intake air pressure PM corresponding to the intake air amount GA differs depending on the operational cam angle INCAM of the intake valve 35.

A change in the operational cam angle INCAM of the intake valve 35 is reflected as a change in the correlation between the intake air amount GA and the intake air pressure PM. Thus, the operational cam angle INCAM of the intake valve 35 may be estimated based on the intake air amount GA and the intake air pressure PM. The operational cam angle INCAM of the intake valve 35 is estimated based on a change in the correlation between the intake air amount GA and the intake air pressure PM. This minimizes the influence of the throttle opening degree TA on the operational cam angle INCAM and enables accurate estimation of the operational cam angle INCAM.

Figure 7:
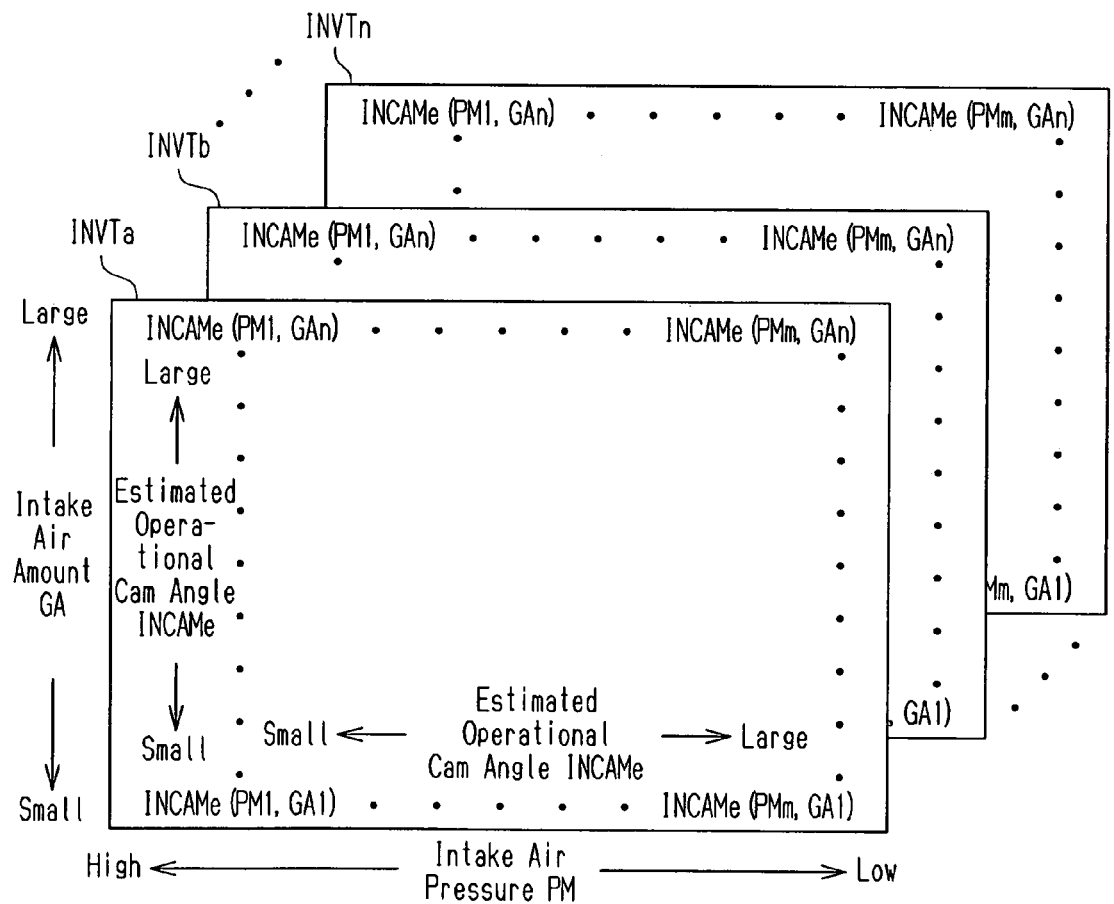
FIG. 7 is a diagram showing maps for setting an estimated cam angle in the engine shown in FIG. 1.

In the preferred embodiment, the memory of the ECU 9 stores maps for setting the estimated cam angle such as those shown in FIG. 7. The estimated operational cam angle INCAMe is obtained by referring to these maps. Each of these maps shows the relationship between the intake air amount GA and the operational cam angle INCAM, and the relationship between the intake air pressure PM and the operational cam angle INCAM. Each of these maps is set so that the obtained value of the estimated operational cam angle INCAMe increases as the intake air pressure PM decreases or as the intake air amount GA increases.

The condition of the intake air changes when the valve timing INVT of the intake valve 35 changes. In the same manner, when the operational cam angle INCAM of the intake valve 35 changes, such a change in the valve timing INVT also changes the correlation between the intake air amount GA and the intake air pressure PM. The engine 1 incorporating the valve timing adjustment mechanism 51 reflects the valve timing INVT of the intake valve 35 in the estimation of the operational cam angle INCAM. This enables accurate estimation of the operational cam angle INCAM. A map is prepared in correspondence with each valve timing INVT.

In step S120, the map for setting the estimated cam angle is selected based on the valve timing INVT, and the selected map is used to obtain the estimated operational cam angle INCAMe from the intake air amount GA and the intake air pressure PM.

Next, the target valve timing INVTp is obtained based on the estimated operational cam angle INCAMe. Further, the target throttle opening degree TAp is corrected based on the estimated operational cam angle INCAMe (S130). More specifically, the target valve timing INVTp is set based on the estimated operational cam angle INCAMe using a target valve timing setting map that is stored in the memory of the ECU 9. The target valve timing setting map is set in the manner shown in FIG. 8. When setting the target valve timing, the factors described below are taken into consideration.

When the combination of the operational cam angle INCAM and the valve timing INVT of the intake valve 35 is inappropriate, this may have an adverse effect on the engine operation state.

For example, the valve timing INVT may be retarded and the open timing IVO of the intake valve 35 may be delayed. Further, as the operation cam angle INCAM decreases, that is, as the maximum lift amount VL decreases, the temperature of the intake air flowing from the intake port 31 into the combustion chamber 23 is more likely to increase. The increased temperature of intake air may cause knocking in the engine. The range in which knocking may occur is indicated by "A" in FIG. 8.

When the valve timing INVT is retarded, as the close timing IVC of the intake valve 35 is delayed from the bottom dead center of the piston 22 and the operational cam angle INCAM increases, that is, the maximum lift amount VL increases, the rising of the piston 22 from the bottom dead center draws the intake air in the combustion chamber 23 back to the intake port 31. As a result, the intake air amount becomes insufficient. The range in which the intake air amount becomes insufficient is indicated by "B" in FIG. 8.

When the valve timing INVT is advanced, as the open timing IVO of the intake valve 35 is advanced and the valve overlap amount increases and the operational cam angle INCAM increases, that is, the maximum lift amount VL increases, the overlap amount increases. This may result in a misfire of the air-fuel mixture. The range in which the intake air amount becomes insufficient is as indicated by "C" in FIG. 8.

The relationship between the estimated operational cam angle INCAMe and the target valve timing INVTp is set in the target valve timing setting map to avoid ranges A to C. Basically, the target valve timing INVTP is set based on the estimated operational cam angle INCAMe so that the set target valve timing INVTp is more retarded as the estimated operational cam angle INCAMe increases. In the map shown in FIG. 8, the line representing the relationship between the estimated operational cam angle INCAMe and the target valve timing INVTp is inclined downward to the right.

In this way, when the operational cam angle INCAM cannot be detected, the target valve timing INVTp is properly set based on the estimated operational cam angle INCAMe. This optimizes the combination of the actual operational cam angle INCAM and the valve timing INVT of the intake valve 35. Thus, the engine 1 can be driven continuously as long as possible even when the operational cam angle INCAM cannot be detected. Thus, even when, for example, an abnormality occurs in the cam angle sensor 96 in the vehicle on which the engine 1 is mounted, the vehicle may be driven to a safe place.

Figure 9:
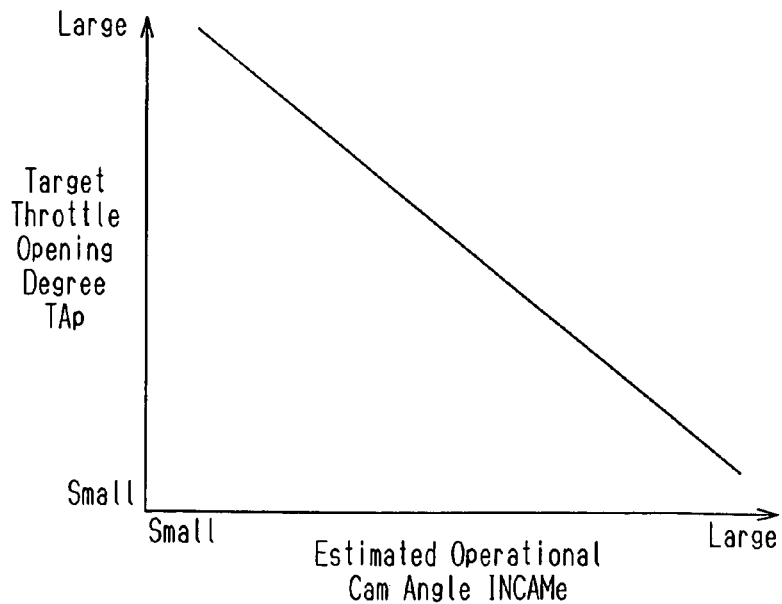
FIG. 9 is a diagram showing a map for correcting a target throttle opening degree in the engine shown in FIG. 1.

In step S120, the target throttle opening degree TAp is corrected. More specifically, the target throttle opening degree TAp, which is set based on the accelerator depression amount ACCP, the engine speed NE, etc., is corrected based on the estimated operational cam angle INCAMe using a target throttle opening degree correction map that is stored in the memory of the ECU 9. As shown in FIG. 9, the target throttle opening degree correction map is set so that the target throttle opening degree TAp decreases as the estimated operational cam angle INCAMe increases. Thus, the target throttle opening degree TAp corresponding to the accelerator depression amount ACCP etc. is corrected to increase as the operational cam angle INCAM decreases. This ensures that the required amount of intake air flows into the combustion chamber 23. Further, the target throttle opening degree TAp corresponding to the accelerator depression amount ACCP etc. is corrected to decrease as the operational cam angle INCAM increases. This prevents excess intake air from flowing into the combustion chamber 23. Thus, the throttle opening degree TA corresponding to the required intake air amount is ensured in an optimal manner.

In this manner, when the operational cam angle INCAM cannot be detected, the target throttle opening degree TAp is corrected based on the estimated operational cam angle INCAMe. This ensures that the engine output required by the driver, or the required intake air amount, is obtained. Thus, the engine 1 may be continuously operated for as long as possible as required by the driver even when the operational cam angle INCAM cannot be detected. Thus, even when an abnormality occurs in the cam angle sensor 96 in the vehicle on which the engine 1 is mounted, the vehicle may be driven to a safe place.

When the target valve timing INVTP is set and the target throttle opening degree TAp is corrected, this process is temporarily terminated.

The valve timing adjustment mechanism 51 is controlled to be driven to adjust the valve timing INVT to the target valve timing INVTp. The throttle valve 38 is controlled to be driven to adjust the throttle opening degree TA to the target throttle opening degree TAp.

When the cam angle sensor 96 is determined as having an abnormality in step S100, the cam angle adjustment mechanism 53 is open loop controlled until the maximum lift amount VL is adjusted to a value enabling the engine 1 to be operated. When the cam angle sensor 96 is determined as having an abnormality, the operation of the cam angle adjustment mechanism 53 may be stopped. Further, the cam angle adjustment mechanism 53 may be feedback-controlled based on the estimated operational cam angle INCAMe.

The preferred embodiment of the present invention has the advantages described below.

(1) The estimated value of the operational cam angle INCAM of the intake valve 35 (estimated operational cam angle INCAMe) is calculated based on the intake air amount GA and the intake air pressure PM. Thus, the operational cam angle INCAM is accurately estimated without relying on the detection result of the cam angle sensor 96.

(2) The valve timing INVT of the intake valve 35 is reflected in the estimation of the operational cam angle INCAM. Thus, in the engine 1 that variably adjusts the operational cam angle INCAM and the valve timing INVT of the intake valve 35, the operational cam angle INCAM is accurately estimated.

(3) When the operational cam angle INCAM cannot be detected with the cam angle sensor 96, the estimated value of the operational cam angle INCAM of the intake valve 35 (estimated operational cam angle INCAMe) is calculated in the manner described above. In the preferred embodiment, the operational cam angle INCAM is estimated more accurately than in prior art. The accuracy of the estimated cam angle is also higher than in the prior art. The ECU 9 executes engine control based on the operational cam angle INCAM estimated in the manner described above (estimated operational cam angle INCAMe). Accordingly, engine control is optimally executed even when the operational cam angle INCAM cannot be accurately detected with the cam angle sensor 96.

(4) When the operational cam angle INCAM cannot be detected, the target valve timing INVTP is set based on the estimated operational cam angle INCAMe. This optimizes the combination of the actual operational cam angle INCAM and the valve timing INVT of the intake valve 35. This enables the engine 1 to be continuously operated for as long as possible even when the operational cam angle INCAM cannot be detected. Thus, even when, for example, an abnormality occurs in the cam angle sensor 96 in the vehicle on which the engine 1 is mounted, the vehicle may be driven to a safe place.

(5) When the operational cam angle INCAM cannot be detected, the target throttle opening degree TAp is corrected based on the estimated operational cam angle INCAMe. This ensures that the engine output required by the driver, or the required intake air amount, is obtained. Thus, the engine 1 may be continuously operated for as long as possible as required by the driver even when the operational cam angle INCAM cannot be detected. Accordingly, when, for example, an abnormality occurs in the cam angle sensor 96 in the vehicle on which the engine 1 is mounted, the vehicle can be easily driven to a safe place.

It should be apparent to those skilled in the art that the present invention may be embodied in many other specific forms without departing from the spirit or scope of the invention. Particularly, it should be understood that the present invention may be embodied in the following forms.

Figure 8:
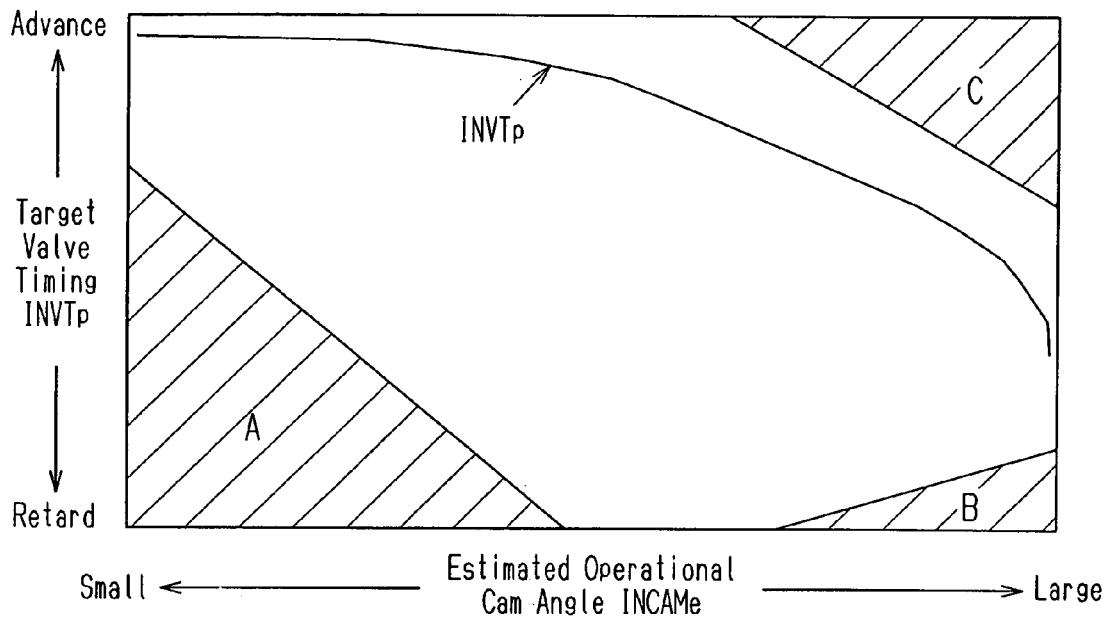
FIG. 8 is a diagram showing a map for setting a target valve timing setting map in the engine shown in FIG. 1.

Instead of the maps shown in FIGS. 7 to 9, function expressions may be used to set the estimated operational cam angle INCAMe, set the target valve timing INVTp, and correct the target throttle opening degree TAp.

In the preferred embodiment, the valve open period (operational cam angle INCAM) of the intake valve 35 is estimated. Alternatively, the lift amount (maximum lift amount VL) of the intake valve 35 may be estimated. Further, when the maximum lift amount VL of the intake valve 35 is estimated, the target valve timing INVTp may be set or the target throttle opening degree TAp may be corrected based on the estimated maximum lift amount VL. When the maximum lift amount VL of the intake valve 35 is estimated, the cam angle adjustment mechanism 53 may be replaced by a lift amount adjustment mechanism that changes only the maximum lift amount VL of the intake valve 35.

The cam angle sensor 96 detects the operational cam angle INCAM of the intake valve 35. However, any sensor that detects the operating status of the cam angle adjustment mechanism 53 may be used. For example, the cam angle sensor 96 may be a sensor for detecting the current-status of the maximum lift amount of the intake valve 35.

The variable valve mechanism 5 includes the valve timing adjustment mechanism 51, which changes the valve timing of the intake valve 35, and the cam angle adjustment mechanism 53, which changes the maximum lift amount VL and valve open period IVOT of the intake valve 35. The present invention may also be applied to a variable valve mechanism 5 that includes only the cam angle adjustment mechanism 53. The present invention may also be applied to a variable valve mechanism 5 that changes only the valve open period IVOT of the intake valve 35.

The present examples and embodiments are to be considered as illustrative and not restrictive, and the invention is not to be limited to the details given herein, but may be modified within the scope and equivalence of the appended claims.

What is claimed is:

1. A controller for an internal combustion engine that incorporates a valve characteristic adjustment mechanism for varying a valve characteristic including at least one of a valve open period and a lift amount of an intake valve, and a sensor for detecting a current status of the value of the valve characteristic, the controller comprising:
   a control unit connectable to the engine for controlling the engine based on a detected value of the sensor; and
   an estimation unit for detecting intake air amount and intake air pressure of the engine when the sensor is disabled, calculating an estimated value for the valve characteristic based on the detected intake air amount and intake air pressure, and the control unit controlling the engine based on the estimated value, wherein:
   the internal combustion engine further includes a throttle valve for adjusting the intake air amount; and
   the control unit corrects target opening degree for the throttle valve based on the estimated value of the valve characteristic when the valve characteristic cannot be detected.

2. The controller according to claim 1, wherein:
   the internal combustion engine further includes a valve timing adjustment mechanism for variably adjusting valve timing of the intake valve in accordance with operation state of the engine; and
   the estimation unit calculates the estimated value of the valve characteristic further based on the valve timing of the intake valve.

3. The controller according to claim 2, wherein the control unit sets a target value for the valve timing based on the estimated value of the valve characteristic when the sensor cannot detect the valve characteristic.

4. The controller according to claim 3, wherein:
   the valve characteristic is the valve open period of the intake valve;
   the control unit includes a two-dimensional map of a relationship between the target value of the valve timing and the valve open period of the intake valve, with the valve open period of the intake valve increasing along a horizontal axis of the map, and the valve timing advancing along a vertical axis of the map, and
   the target value of the valve timing is set in a range of the map excluding at least one of a range in which the valve timing is retarded and the valve open period is short, a range in which the valve timing is retarded and the valve open period is long, and a range in which the valve timing is advanced and the valve open period is short.

5. A valve characteristic estimation method for an internal combustion engine that incorporates a valve characteristic adjustment mechanism for varying a valve characteristic including at least one of a valve open period and a lift amount of an intake valve, the method comprising:
   detecting intake air amount and intake air pressure of the internal combustion engine; and
   calculating an estimated value for the valve characteristic based on the detected intake air amount and intake air pressure,
   wherein the internal combustion engine further includes a sensor for detecting a current status of the value of the valve characteristic and a throttle valve for adjusting the intake air amount, the method further comprising:
   controlling the engine based on the detected value of the sensor;
   calculating the estimated value of the valve characteristic based on the intake air amount and intake air pressure of the engine when the valve characteristic cannot be detected;
   controlling the engine based on the estimated value; and
   correcting target opening degree for the throttle valve based on the estimated value when the valve characteristic cannot be detected.

* * * * *